(12) United States Patent
Lau

(10) Patent No.: US 9,668,600 B1
(45) Date of Patent: Jun. 6, 2017

(54) MULTI-LEVEL SERVING TRAY CARRIER

(71) Applicant: Ka Wai Lau, Brooklyn, NY (US)

(72) Inventor: Ka Wai Lau, Brooklyn, NY (US)

( * ) Notice: Subject to any disclaimer, the term of this patent is extended or adjusted under 35 U.S.C. 154(b) by 0 days.

(21) Appl. No.: 14/998,496

(22) Filed: Jan. 12, 2016

(51) Int. Cl.
  *A47G 23/06* (2006.01)
  *A47B 43/00* (2006.01)
  *A47B 45/00* (2006.01)
  *A47B 81/00* (2006.01)
  *A47B 55/00* (2006.01)
  *A47F 7/28* (2006.01)
  *A47F 5/10* (2006.01)

(52) U.S. Cl.
  CPC .............. *A47G 23/06* (2013.01); *A47B 43/00* (2013.01); *A47B 45/00* (2013.01); *A47B 55/00* (2013.01); *A47B 81/00* (2013.01); *A47F 5/10* (2013.01); *A47F 7/281* (2013.01); *A47F 7/283* (2013.01)

(58) Field of Classification Search
  CPC ........ A47G 23/06; A47B 43/00; A47B 45/00; A47B 55/00; A47B 81/00; A47F 5/10; A47F 5/12; A47F 7/281; A47F 7/283
  See application file for complete search history.

(56) References Cited

U.S. PATENT DOCUMENTS

| | | | | |
|---|---|---|---|---|
| 1,769,140 A * | 7/1930 | Kaufman | ................ | A47B 43/00 211/202 |
| 2,305,629 A * | 12/1942 | Magnuson | ............. | A47B 43/00 108/134 |
| 2,556,922 A * | 6/1951 | Hudson | ................... | A47B 3/12 108/101 |
| 3,003,746 A * | 10/1961 | Gridley | ................. | B66F 7/0625 187/243 |
| 3,007,539 A * | 11/1961 | Brewer | .................. | G10K 11/20 160/165 |
| 3,095,974 A * | 7/1963 | Perini | ..................... | A47B 43/00 211/200 |
| 3,215,096 A * | 11/1965 | Holtz | ..................... | A47B 31/04 108/119 |
| 4,244,300 A * | 1/1981 | Leach | .................... | A47B 45/00 108/102 |
| 5,163,262 A * | 11/1992 | Adams | ..................... | B64G 9/00 52/111 |
| 5,199,930 A * | 4/1993 | Weber | ..................... | A63K 3/043 108/117 |
| 5,207,333 A * | 5/1993 | Peng | ...................... | A47B 43/00 187/211 |
| 6,427,858 B2 * | 8/2002 | Sabounjian | ............. | D06F 57/08 211/183 |
| 6,840,182 B2 * | 1/2005 | Price | ...................... | A47B 77/02 108/101 |
| 7,168,580 B2 * | 1/2007 | Larimer | ............... | A47B 73/006 211/181.1 |
| 7,637,220 B2 * | 12/2009 | Fu | .......................... | A47B 43/00 108/115 |

(Continued)

*Primary Examiner* — Patrick Hawn
(74) *Attorney, Agent, or Firm* — Richard L. Strauss

(57) ABSTRACT

A multi-level serving tray carrier is disclosed providing a means of transporting food trays as well as a means of providing a service if such food. The tray carrier, although capable of transporting and providing service access from multiple food trays, only requires an area of counter space ordinarily consumed by a single food tray. The tray carrier opens in such a manner as to provide access to all levels of food trays carried thereby while simultaneously providing great stability.

5 Claims, 16 Drawing Sheets

(56) References Cited

U.S. PATENT DOCUMENTS

| | | | | |
|---|---|---|---|---|
| 8,590,716 B2* | 11/2013 | Behjat | ............ | D06F 57/08 211/195 |
| 9,089,211 B2* | 7/2015 | Wehner | ............ | A47B 43/00 |
| 9,241,564 B2* | 1/2016 | Wehner | ............ | A47B 43/00 |
| 2006/0249059 A1* | 11/2006 | Gagne | ............ | A47B 43/00 108/59 |
| 2010/0314271 A1* | 12/2010 | Baruch | ............ | A47B 43/00 206/349 |
| 2015/0257529 A1* | 9/2015 | Wehner | ............ | A47B 43/00 312/210 |

* cited by examiner

MULTI-LEVEL SERVING TRAY CARRIER

TECHNICAL FIELD

The present invention relates to the field of food ring trays and containers. More specifically, the present invention relates to the field of devices utilized to carry food serving trays to a point or place of use and thereafter position such for food distribution.

BACKGROUND

Bulk food serving trays, often constructed of aluminum, plastic or steel, are commonly utilized to bring large quantities of food to a buffet or other service table. Most commonly, such trays are either placed directly upon a table, with or without tray covers, and thereafter utilized to distribute food to dishes, plates or saucers of guests/customers who which to consume same. In some instances, the trays are placed upon a tray service frame which hold the bottom of the tray above the top surface of a serving table so that. In certain instances, a heating device can be used to keep the contained food warm. Generally the serving trays, filled with different foods, are placed side by side upon a table. Therefore, the tables utilized and spaced demanded for putting such trays out for use must be sufficiently large to accommodate all of the trays. In some instances, multi-level tray frames have been utilized so as to enable more than one tray to be placed within a given area of a tables available surface. However, such trays often limit access to the foods contained in all but the uppermost trays, forcing one to attempt to reach between stacked trays to reach the desired food.

A multiple level tray service frame which included a degree of offset of the trays placed upon same might increase access to a portion of food contained in those trays below the uppermost container, but access to a portion of the food contained in trays with an overlying tray would still pose some access difficulty. One solution to enabling multiple trays to be placed overlying the same portion of a table top might be to provide an offset tray carrier frame that provided for fore/aft movement of each tray relative to overlying trays. However, such a configuration would pose the risk of toppling over the trays and frame due to excessive movement of the upper trays lateral to the base of the tray carrier frame.

It would be highly advantageous if a food tray service frame were disclosed capable of containing, in a stacked configuration, a plurality of bulk food serving trays. It would be still further advantageous if such a tray service frame provided lateral movement of bulk food serving trays so that fore/aft movement of all trays contained therein, above the base of the frame, could move in a manner so as to provide better access to food contained therein positioned under the level of the uppermost tray. It would be still further advantageous if such a tray serving frame included a means to control the fore/aft (lateral) movement of the trays so as to prevent and/or minimize the possibility of the frame, and bulk food trays mounted thereupon, from tipping over.

SUMMARY OF THE INVENTION

Now in accordance with the present invention, a multi-level food serving tray carrier is disclosed. The carrier facilitates the transport of and access to multiple serving trays in such a manner as to minimize the area consumed by such multiple trays at the point of service through a stacking arrangement while, simultaneously, providing a stable tray platform.

The multi-level serving tray carrier of the present invention comprises a base frame, at least one locking adjustment frame, at least one tray carrier frame and a plurality of adjustment arms and fixation means for pivotal attachment of the adjustment arms to one another as well as pivotal and sliding affixation to the frames.

The base frame of the present invention is comprised of two side members and two end members. The two side members each includes a top surface, a bottom surface, two side surfaces and two termini located at opposite ends thereof. The distance running from one termini to the opposite termini defines the length of each side member. A point of reference located midway between said two opposite termini, along the length of each side member defines the midpoint of each side member. Two additional points of reference located on either side of the midpoint and equidistant from the midpoint and each terminus of the two side members defines the two balance points of each side members.

The side surfaces of each of the two side members are especially formed and configured to include at least one sliding adjustment slot formed as an elongated opening therethrough. Each side member also includes one pivot bore.

The two end members of the base frame includes a top surface, a bottom surface, two side surfaces, two termini located at opposite ends of each such end members. The length of each of the two end members is defined as a distance between said two opposite termini. The two end members and two side members of the base frame are especially arranged, configured and affixed together so as to form a rectangular base frame wherein the two side members are positioned opposite to one another and the two end members are also positioned opposite one another so as to form opposite sides of the rectangle base frame. As discussed in more detail below, a reference line running from the midpoint of one side member to the midpoint of the opposite midpoint defines the midline of the rectangular base. In addition, two additional reference lines, also discussed below, running from each of the four balance points of the two side members to a balance point directly opposite each balance point on the opposite side member form two balance lines of the rectangular base frame.

The at least one locking adjustment frame of the present invention is comprised of two side members and two end members. Each of the two side members includes a top surface, a bottom surface, two side surfaces and two termini located at opposite ends of each such side member. A distance running from one termini to the termini located at the opposite end (opposite terminus) of each side member defines the length of each of side members. A point of reference located midway between the two opposite termini defines a midpoint thereof. Each of the two side members of the locking adjustment frame includes a locking adjustment slot configured as an elongated opening formed therethrough. The locking adjustment slot includes at least two branch lock slots which originate and extending laterally from the locking adjustment slot. In addition, each side member of the locking adjustment frame each includes one pivot bore formed therewithin and therethrough.

The two end members of the at least one locking adjustment frame includes a top surface, a bottom surface, two side surfaces and two termini located at opposite ends of each such side member. The distance running from one termini to the termini located at the opposite end of each end member (opposite terminus) defines the length of each end members. The two end members and two side members comprising the locking adjustment frame are arranged, configured and affixed together to form a rectangular shaped locking adjustment frame wherein the two side members are positioned opposite to one another and the two end members are likewise positioned opposite one another. A reference line, discussed in more detail below, runs from the midpoint of one side member to the midpoint of the opposite side member of the locking adjustment frame. This reference line defines and is referred to herein as the midline of the locking adjustment frame.

The at least one tray carrier frame of the present invention comprises two side members and two end members. The two side members of the tray carrier includes a top surface, a bottom surface, two side surfaces and two termini located at opposite ends of each such side member (opposite termini). The distance running from one termini to the opposite termini of each side member defines the length of each of said side members. A point of reference, located midway between the two opposite termini of each side member—along the length of said side members—defines the midpoint of each side member. Each of the two side members of the tray carrier frame includes two adjustment slots formed as a lateral openings formed through said side surfaces.

The two end members of the at least one tray carrier frame includes a top surface, a bottom surface, two side surfaces and two termini located at opposite ends of each such end member. The distance running from one termini to the termini located at the opposite end of each end member (opposite terminus) defines the length of each of said end members. The two end members and two side members comprising the tray carrier frame are arranged, configured and affixed together to form a rectangular shaped frame wherein the two side members are positioned opposite to one another and the two end members are likewise positioned opposite one another. A reference line, discussed in more detail below, runs from the midpoint of one side member to the midpoint of the side member opposite thereto. This reference line defines and is referred to herein as the midline of the tray carrier frame.

The adjustment arms of the present invention are advantageously formed as flattened, elongated struts having two termini located at opposite ends thereof. The present invention includes at least eight adjustment arms. The length of each such adjustment arm is defined as the distance between the two termini located at opposite ends of each such arm. The midpoint of each adjustment arm is defines as a point located midway along the length of each arm, equidistant from the two termini thereof. Each of said arms includes two terminal pivot bores formed as bores running through the flattened elongated adjustment arm adjacent to each of the two termini of each arm. Each adjustment arm also includes a pivot bore formed as a bore running through the flattened elongated adjustment arm at the midpoint thereof. The adjustment arms adjustably affix the base frame, locking adjustment frame and tray carrier frame in such a manner as to enable adjustment of the position of each of said trays in relation to one another in regard to height and lateral (fore/aft) position.

The multi-level serving tray carrier of the present invention also includes means for pivotal affixing the adjustment arms to one another via the central pivot bore formed therewith. Also, a means for pivoting and sliding affixation of said adjustment arms to the base frame, locking adjustment frame and tray carrier frame are also provided. When the adjustment arms are so affixed to one another and to the base, locking and tray carrier frames of the present invention, the adjustment arms, adjustment slots, locking adjustment slots, lock slots and pivot bores are so configured, designed and positioned so that fore and aft (lateral) movement of the adjustment frame and tray carrier frame as well as height adjustment thereof are provided to enable access to serving trays located within and supported by said base, locking adjustment and carrier frames. In addition, the fore/aft (lateral) movement of frays are positively limited by the size, location and dimension of the adjustment slots, and adjustment arms so that neither the locking adjustment frame or the tray carrier frame may be moved laterally to a position beyond a point wherein the midline of either of said locking adjustment tray or tray carrier frame beyond a position wherein said midlines overly the balance line of the base frame. This intentional limitation in lateral (fore/aft) movement of the locking adjustment frame and tray carrier frame(s) prevents the center of gravity of either the adjustment or tray carrier frame to be displaced so far laterally in relation to the base tray as to cause the multi-level tray carrier to become unstable and topple—a further and more detailed discussion of which is set forth, below. In addition, the frames of the present invention are articulated and affixed to one another in such a manner as to cause the locking adjustment frame, the tray carrier frame, and any additional tray carrier frames thereabove, to move laterally—in opposite directions—so as to further stabilize the device and to enable greater access to food contained within trays carried by said frames. It should be noted, that, although the design and configuration of the multi-level tray carrier of the present invention provides the aforementioned stability by limiting lateral displacement and providing such displacement in opposite lateral directions, the locking adjustment trays motion, laterally, upon opening of the device is automatic whereas the tray carrier frame is manually moved within the confines of the limited motion providing stability.

DETAILED DESCRIPTION

Figure 1:
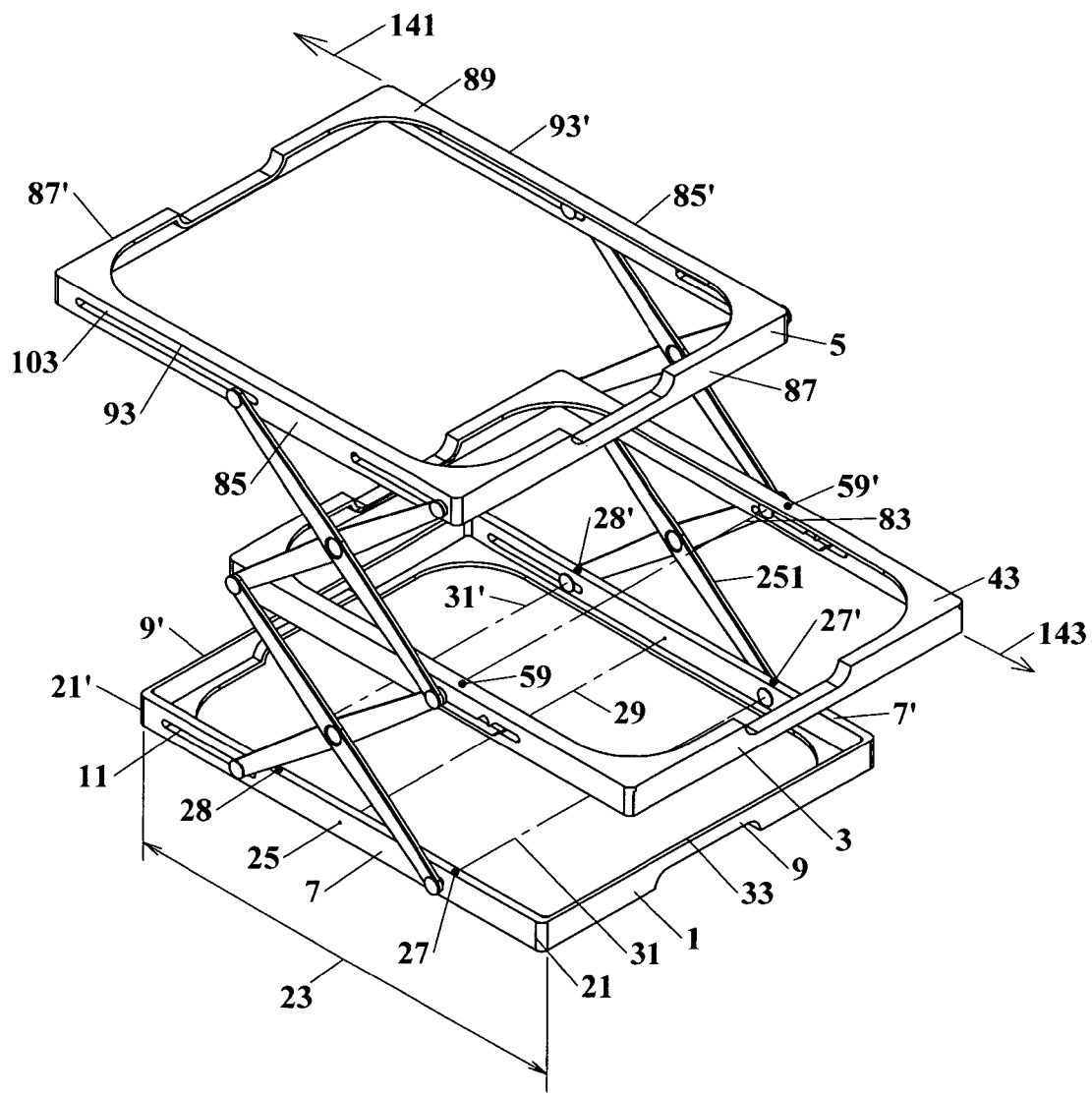
FIG. 1 illustrates a top isomeric view of the first preferred embodiment of the multi-level serving tray carrier of the present invention.
Figure 2:
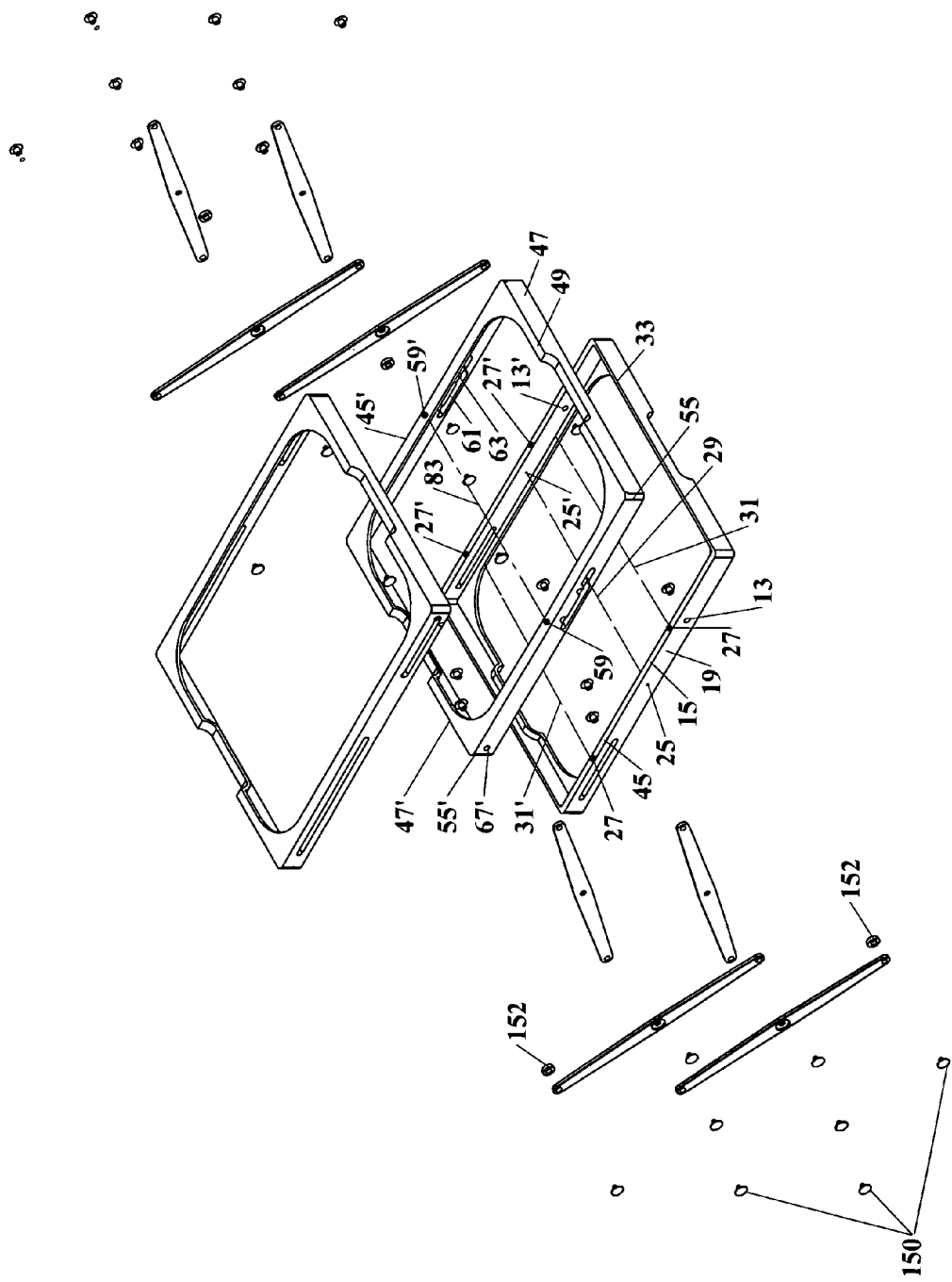
FIG. 2 illustrates an exploded view of the tray carrier illustrated in FIG. 1.
Figure 3:
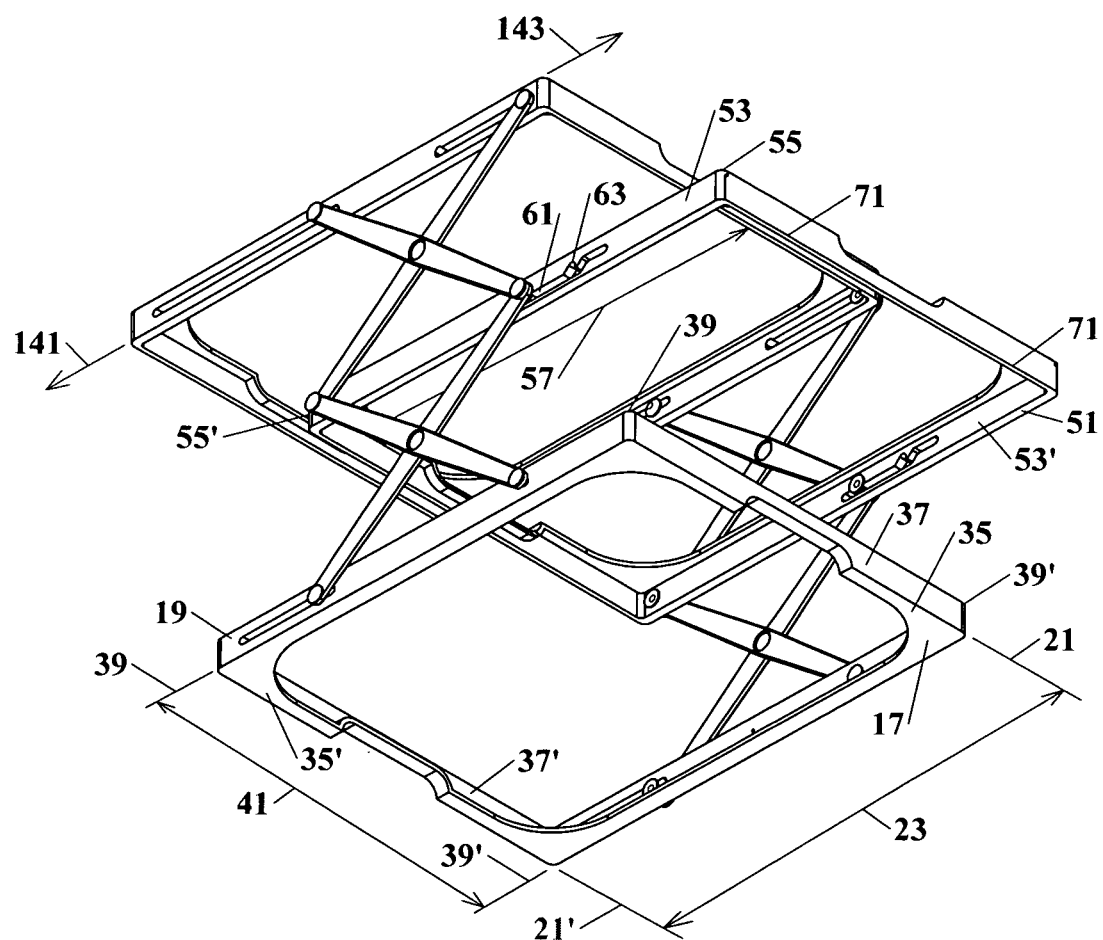
FIG. 3 illustrates a bottom isomeric view of the first preferred embodiment of the multi-level serving tray carrier of the present invention.
Figure 4:
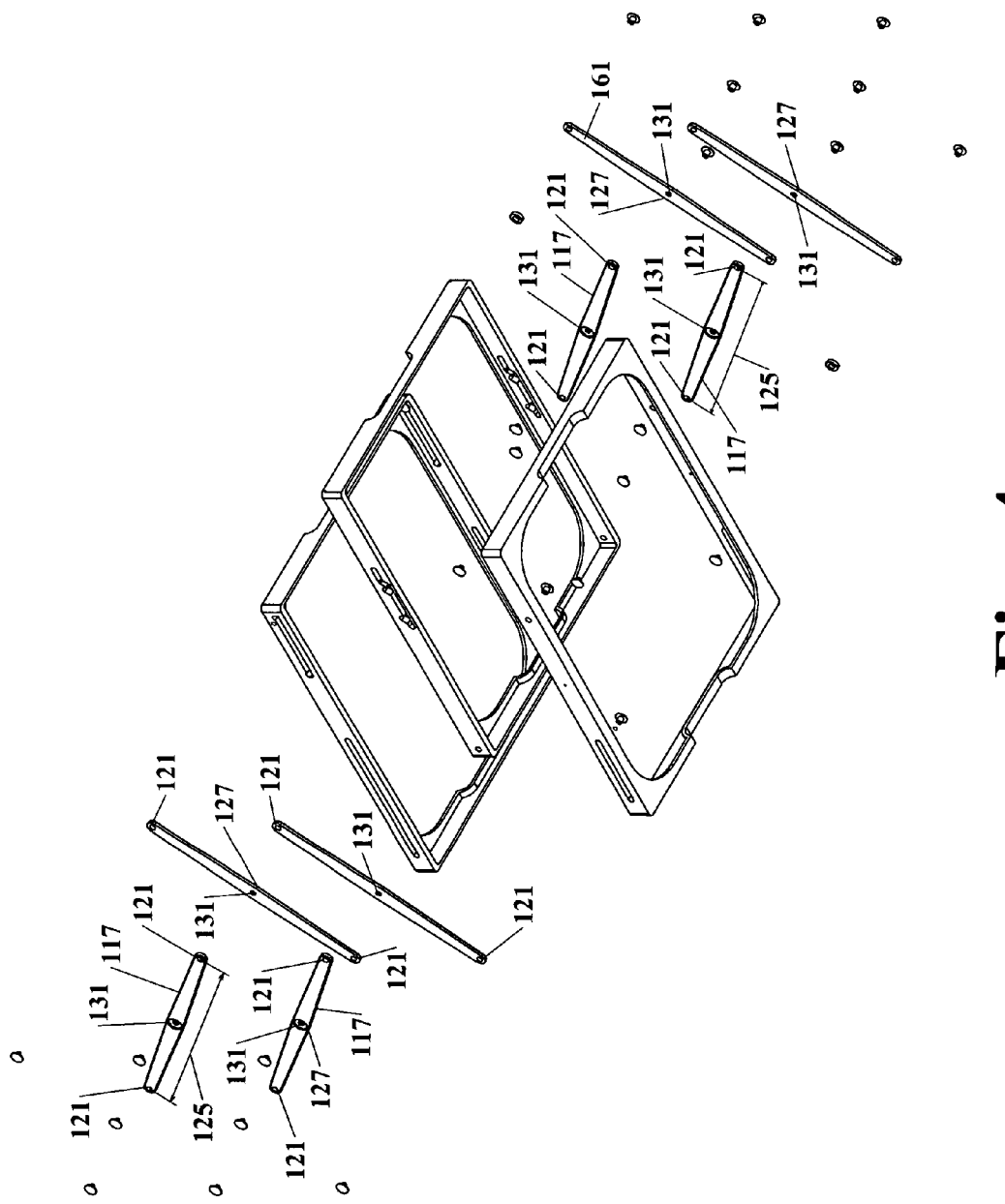
FIG. 4 illustrates an exploded view of the tray carrier illustrated in FIG. 1.

In the first preferred embodiment of the present invention, the multi-level serving tray carrier comprises a base frame, one locking adjustment frame, and one tray carrier frame. Further embodiments of the present invention utilize more than one serving tray frame and, likewise, may optionally include more than one locking adjustment frame. However, in the first preferred embodiment of the present invention illustrated in FIG. 1-FIG. 4 a single base frame, locking adjustment frame and tray carrier frame are utilized. FIG. 1 is a top isomeric view of the first preferred embodiment which includes a base frame 1 a locking adjustment frame 3 and a tray carrier frame 5. The base frame includes two side members 7 and 7' and two end members 9 and 9'.

The side members of the base frame include sliding adjustment slots 11 and 11'. As discussed above, the adjustment slots 11 provide a means of enabling fore/aft manipulation of the trays relative to one another. In addition to the adjustment slot, each of the side members of the base frame also include a pivot bore penetrating therethrough 13/13'. Side member 7 and 7' and end members 9 and 9' are affixed to one another in such a manner as to form a frame having a rectangular configuration and so each side member is in a position directly opposite the remaining side member and each end member is likewise opposite an end member. Each of the side members comprising the base frame demonstrate a top surface 15, a bottom surface 17, two side surfaces with an inner 19 and outer 19' aspect. The side member also includes two termini 21/21' located at opposite ends of each such end member. The distance measured between the two termini of each side member defines the length 23 of the side member. A point of reference located midway between said two termini, along the length of each side member defines the midpoint 25 of each side member. Two additional points of reference located half way between the midpoint of each side member and the two opposite termini thereof define two balance points 27.

Figure 5:
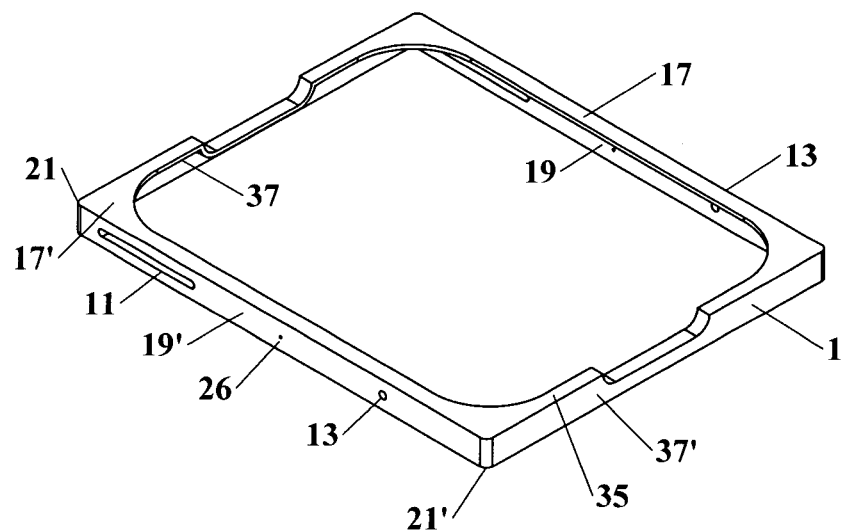
FIG. 5 illustrates a top side isomeric view of the base frame of the tray carrier illustrated in FIG. 1.
Figure 6:
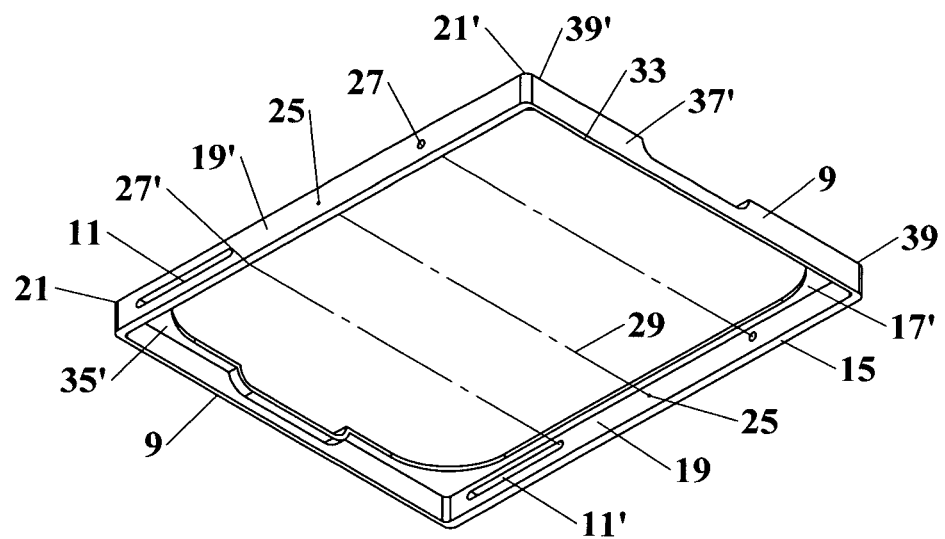
FIG. 6 illustrates a bottom side isomeric view of the base frame illustrated in FIG. 5.

In the first preferred embodiment, the bottom surface of the base frame is especially shaped and configured to enable a standard sized serving tray to rest upon the inner aspect 17' of end member 9. The base frame is illustrated in isolated detail in FIGS. 5 and 6 as well as incorporated within the preferred embodiment in FIGS. 1-4. Also, the rectangular shape frame formed by the two side and two end members of the base frame are likewise configured so as to enable a standard food tray to fit within the opening formed thereby and rest upon the inner aspect of the bottom member for additional secure retention of such trays.

An imaginary reference line running from the midpoint 25 of each of the two opposite side member defines the midline 29 of the base tray. In addition, two reference line 31/31' running between pairs of opposite balance points 27/27' and 28/28' provide two balance lines 31/31' of the base frame.

The two end members of the base frame include a top surface 33, a bottom surface with an outer 35 and inner 35' aspect, two side surfaces with an inner 37 and outer 37' aspect, two termini 39/39' located at opposite ends of each such end members. The length 41 of each of the two end members is defined as the distance between said two opposite termini. The two end members and two side members comprising the base frame are arranged, configured and affixed together to form a rectangular shaped frame wherein the two side members demonstrate the same length and are positioned opposite to one another and the two end members demonstrate the same length and are likewise positioned opposite one another.

Figure 7:
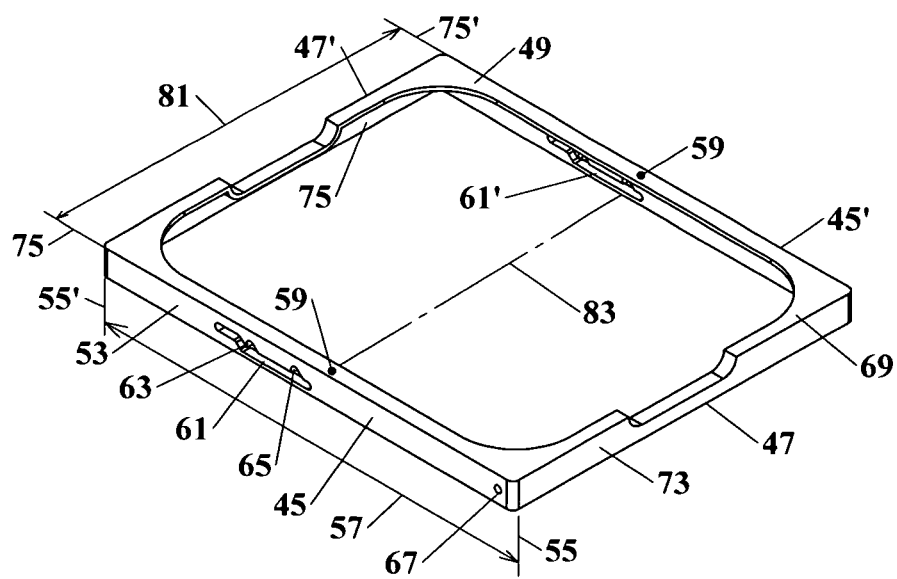
FIG. 7 illustrates a top side isomeric view of the locking adjustment frame of the tray carrier illustrated in FIG. 1.
Figure 8:
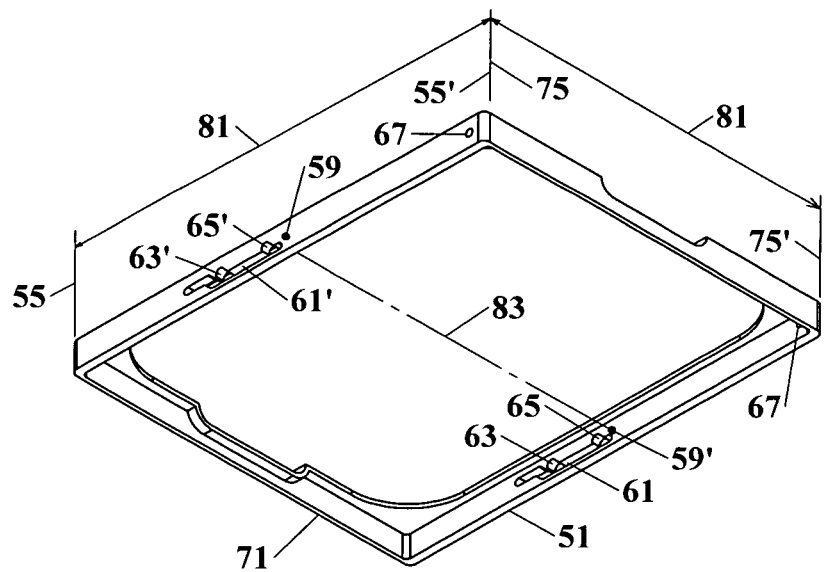
FIG. 8 illustrates a bottom side isomeric view of the locking adjustment frame illustrated in FIG. 7.

The at least one locking adjustment frame 43 of the present invention is comprised of two side members 45/45' and two end members 47/47'. FIGS. 7 and 8 illustrated the locking adjustment tray in isolation and said tray is also illustrated incorporated within the preferred embodiment within FIGS. 1-4. Each of the two side members includes a top surface 49, a bottom surface 51, two side surfaces 53/53' and two termini 55/55' located at opposite ends of each such side member. The distance running from one termini to the termini located at the opposite end of each side member define the length 57 of each of side members. A point of reference located midway between the two opposite termini located at opposite ends of each side member defines a midpoint 59/59' thereof. Each of the two side members of the locking adjustment frame includes a locking adjustment slot 61 configured as an elongated opening formed therethrough. The locking adjustment slot includes at least two branch lock slots 63 and 65 which originate and extending laterally therefrom the locking adjustment slot. In addition, each side member of the locking adjustment frame each includes one pivot bore 67 formed therewithin and therethrough. The locking adjustment slot and the branch lock slots function to lock the device into a desired position as to the height of the device.

The two end members 47/47' of the at least one locking adjustment frame include a top surface 69, a bottom surface 71, two side surfaces 73/73' and two termini 75/75' located at opposite ends of each such side member. The distance running from one termini to the opposite termini of each end member defines the length 81 for each of said end members. The two end members and two side members comprising the locking adjustment frame are arranged, configured and affixed together to form a rectangular shaped locking adjustment frame wherein the two side members demonstrate the same length and are positioned opposite to one another and the two end members demonstrate the same length and are likewise positioned opposite one another.

A reference line, discussed in more detail below, runs from the midpoint of one side member to the midpoint of the opposite side member. This reference line defines and is referred to herein as the midline 83 of the locking adjustment frame.

Figure 9:
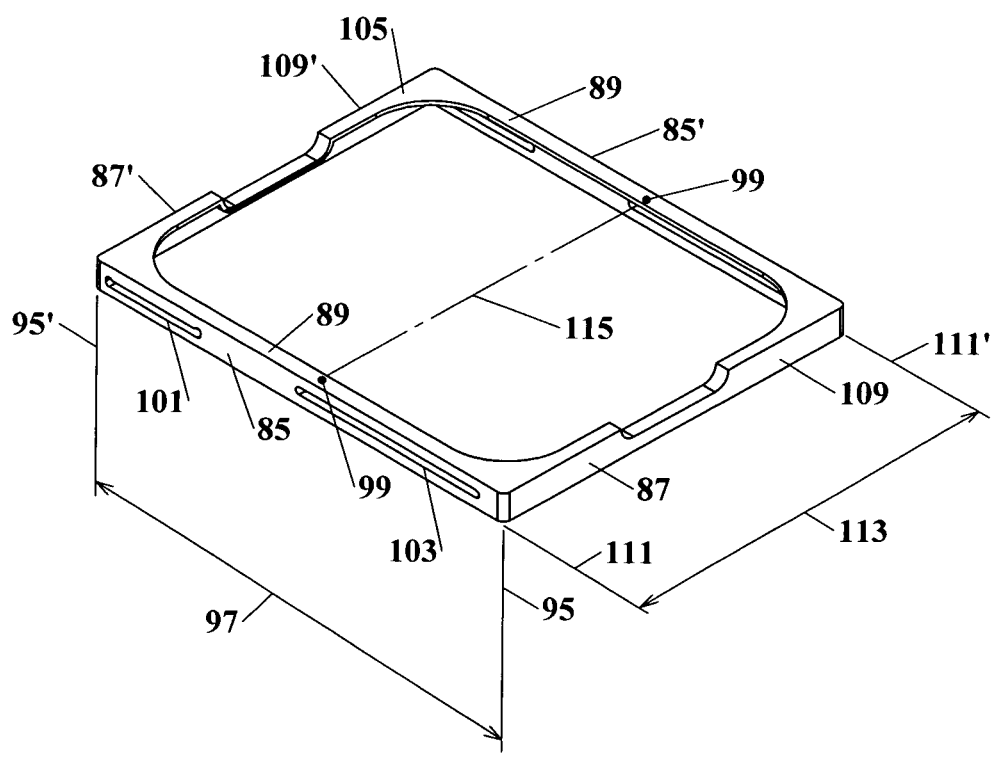
FIG. 9 illustrates a top side isomeric view of the the tray carrier frame of the tray carrier illustrated in FIG. 1.
Figure 10:
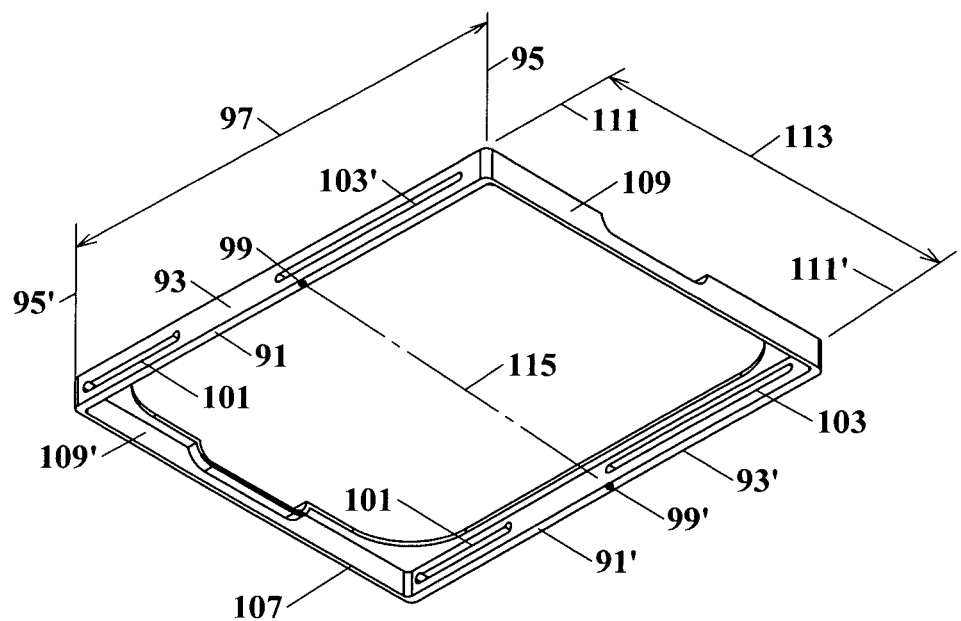
FIG. 10 illustrates a bottom side isomeric view of the tray carrier frame illustrated in FIG. 9.
Figure 11:
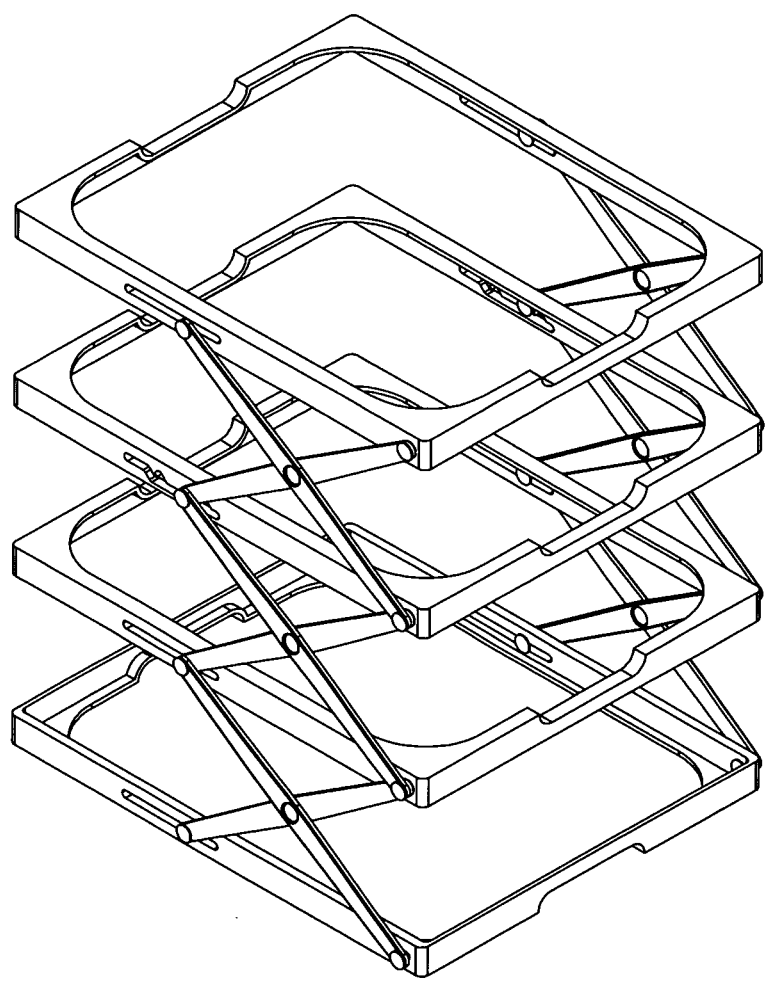
FIG. 11 illustrates an alternate embodiment of present invention incorporating two tray carrier frames.
Figure 12:
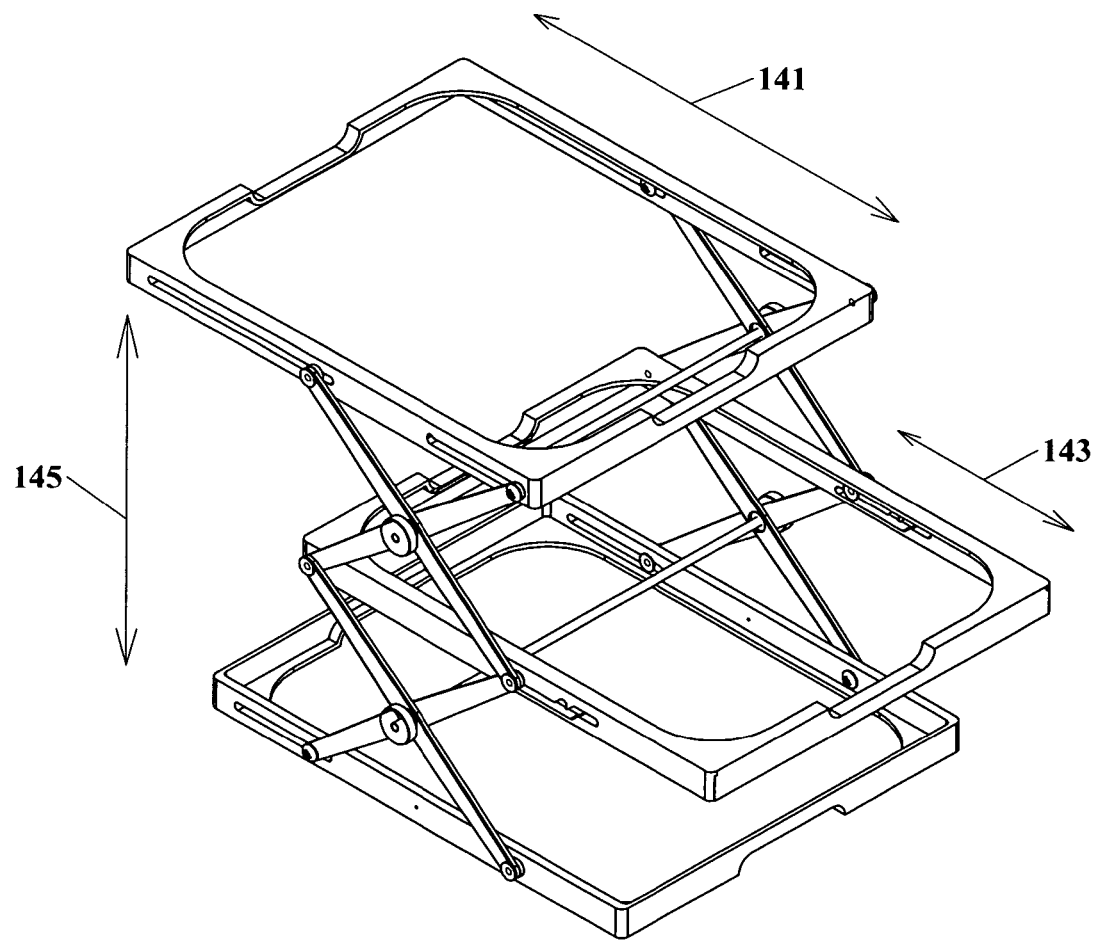
FIG. 12 illustrated the preferred embodiment of the present invention in a fully open position.

The at least one tray carrier frame 5 of the present invention comprises two side members 85/85' and two end members 87/87'. The tray carrier frame is illustrated, separately, in FIGS. 9 and 10. The two side members of the tray carrier includes a top surface 89, a bottom surface 91, two side surfaces 93/93' and two termini 95/95' located at opposite ends of each such side member. The distance running from one termini to the termini located at the opposite end of each side member defines the length 97 of each of said side members. A point of reference, located midway between the two opposite termini of each side member—along the length of said side members—defines the midpoint 99 of each side member. Each of the two side members of the tray carrier frame include two adjustment slots 101 and 103 formed as a lateral opening formed through said side surfaces.

The two end members 87/87' of the at least one tray carrier frame include a top surface 105, a bottom surface 107, two side surfaces 109/109' and two termini 111/111' located at opposite ends of each such end member. The distance running from one termini to the opposite termini located at the opposite end of each end member defines the length 113 for each of said end members. The two end members and two side members comprising the tray carrier frame are arranged, configured and affixed together to form a rectangular shaped frame wherein the two side members, demonstrating equal length, are positioned opposite to one another and the two end members also having a length equal to one another, are likewise positioned opposite one another. A reference line, discussed in more detail below, runs from the midpoint 99 of one side member to the midpoint of the side member opposite thereto. This reference line defines and is referred to herein as the midline 115 of the tray carrier frame.

Figure 13:
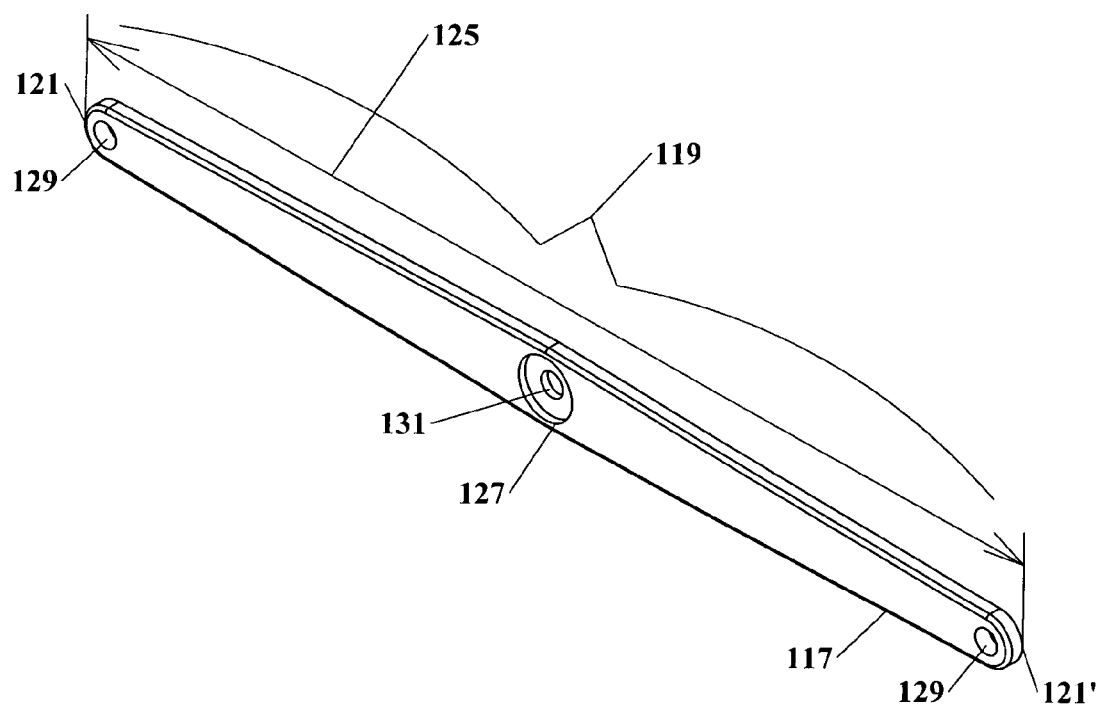
FIG. 13 illustrates the adjustment arm of the present invention

As shown in detail in FIG. 13, the adjustment arms 117 of the present invention are advantageously formed as flattened, elongated struts 119 having two termini 121/121' located at opposite ends thereof. The present invention includes at least eight adjustment arms. The length of each such adjustment arm is defined as the distance 125 between the two termini located at opposite ends of each such arm. A midpoint 127 of each adjustment arm is defined as a point located midway along the length of each arm, equidistant from the two termini thereof Each of said arms includes two terminal pivot bores 129 formed as bores running through the flattened adjustment arms that are located adjacent to each termini of each arm. Each adjustment arm also includes a central pivot bore 131 formed as a bore running through the flattened adjustment arm at the midpoint thereof. The adjustment arms adjustably affix the base frame, locking adjustment frame and tray carrier frame in such a manner as to enable adjustment of the position of each of said trays in relation to one another in regard to height and lateral (fore/aft) position. Such movement involves extension and retraction of the locking adjustment frame and tray carrier frame in such a manner that the end members of each frame move laterally, fore and aft. Bolts, screws, washers, bushings, rivets, collets, bearings and other fasteners, well known to the art, may be utilized for this purpose as long as such fasteners allow the rotational and sliding movement required for the fore/aft and height adjustment required by the tray carrier.

The multi-level serving tray carrier of the present invention also includes means for pivotal affixation of the adjustment arms to one another via the central pivot bore formed therewith. Such fixation means are well known to the art and include bolts 150, screws, washers, bearings, collets, nuts 152 rivets and other like fasteners—provided the fasteners selected provide the necessary rotational (pivoting) motion required at the junction of one pivot arm to another. Also, a means for pivoting and sliding affixation of said adjustment arms to the base frame, locking adjustment frame and tray carrier frame are also provided. Such means may also include bolts, washers, screws, bearing collets, rivets and any other fastener, well known to the art, that enable such pivoting and sliding affixation. In addition, reinforcement struts may be utilized to further stabilize the base frame, locking adjustment frame and tray carrier frames of the present invention.

Figure 14:
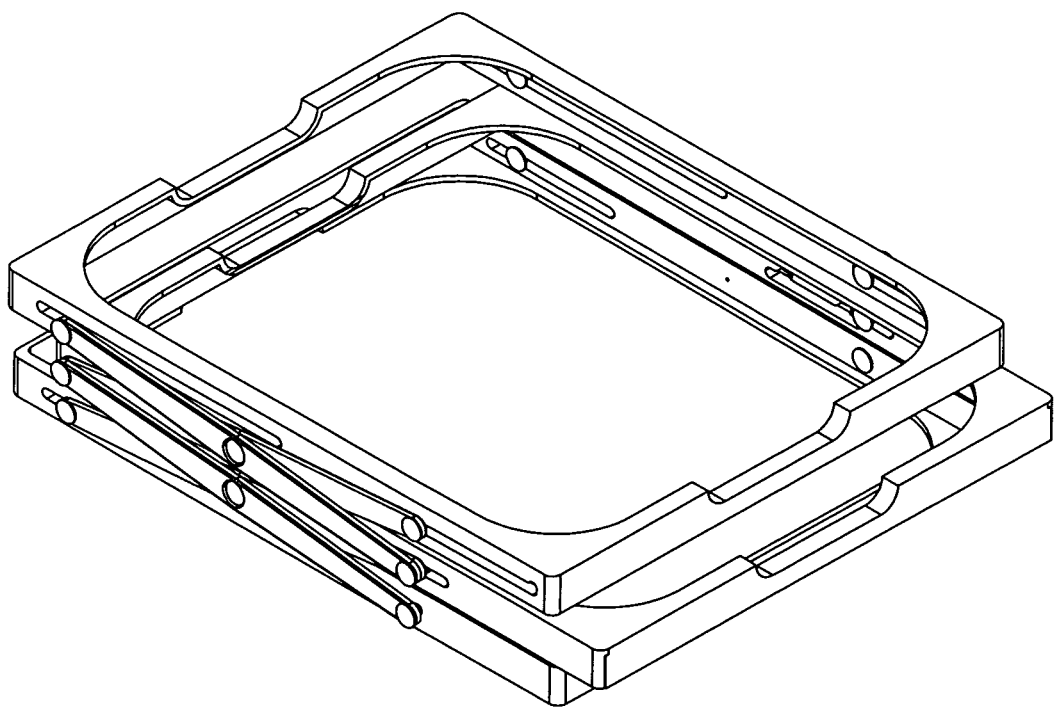
FIG. 14 illustrates the multi-level serving tray carrier of the first preferred embodiment in a closed position wherein all the carrier frames are positioned in vertical alignment suitable for transporting the serving tray carrier.
Figure 15:
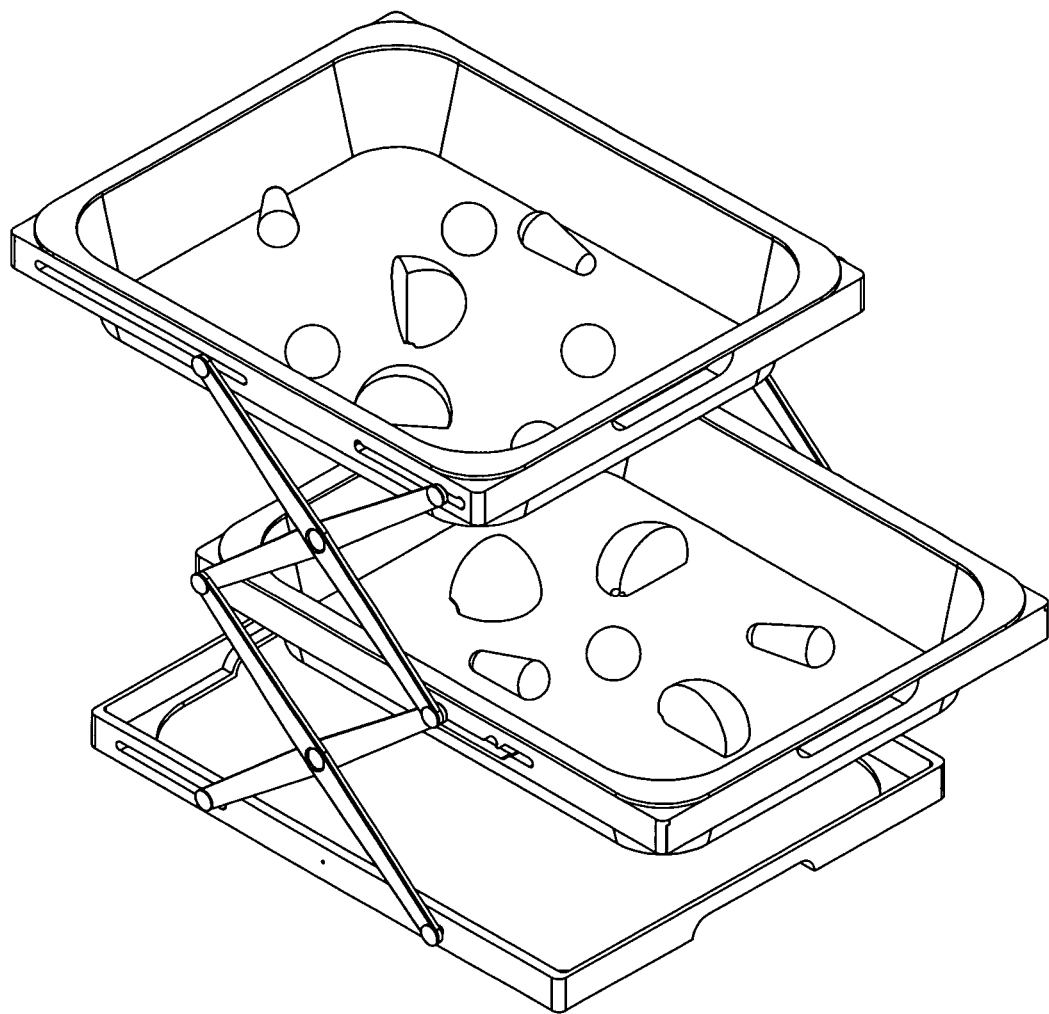
FIG. 15 illustrates the tray carrier illustrated in FIG. 13 wherein the locking adjustment frame and the tray carrier frame have been moved laterally out of vertical alignment from one another and into a serving position.

When the adjustment arms are so affixed to one another and to the base, locking and tray carrier frames of the present invention, the adjustment arms, adjustment slots, locking adjustment slots, lock slots and pivot bores are so configured, designed and positioned so that fore 141 and aft 143 (lateral) movement of the adjustment frame and tray carrier frame as well as height 145 adjustment thereof are provided to enable access to serving trays located within and supported by said base, locking adjustment and carrier frames. All embodiments of the present invention require, as an essential element, that the fore/aft (lateral) movement of the locking adjustment and tray carrier frames are positively limited by the size, location and dimension of the adjustment slots, and adjustment arms in the following manner. Neither the adjustment or tray carrier frame(s) may be moved laterally 141/143 to a position beyond the point wherein the midline of either of said adjustment and tray carrier frame moves laterally beyond a position overlying the balance line of the base frame. As shown in FIG. 14, the illustration shows the multi-level serving tray carrier in a "closed position" wherein the midlines of the base, locking adjustment and tray carrier frame are all in vertical alignment. As shown in FIG. 15, the locking adjustment frame and tray carrier frame have now been moved to the limit of lateral movement provided by the configuration and position of the adjustment arms and the slots/bores formed in the side members of the frames. In this extreme position, the trays are separated through elevation of both the locking adjustment frame as well as the tray carrier frame. This separation, of course, provides access to serving trays positioned on the base frame and locking adjustment frame no available in the "closed" position. The shape, size and configuration of each tray is especially arranged so as to enable the device to securely engage and contain such trays. As noted in FIG. 15, fully open configuration illustrated in this diagram shows that in this position, the midlines of both the locking adjustment and tray carrier frames overly, but do not extend laterally beyond the balance lines of the base tray.

As discussed above, the limitation of lateral movement provided by the device of the present invention greatly improves the stability of the device by preventing the locking adjustment frame as well as the tray carrier frame from moving laterally beyond the position (midlines overlying base tray balance line) whereby the upper two frames and the trays mounted thereupon would lose stability and tend to tip over. Furthermore, by configuring the adjustment arms, slots, bores in the manner described, the upper locking adjustment frame and tray carrier frame are caused to move, upon device opening, in opposite lateral directions. Thus when the device is opened, one tray moves aft as the overlying tray moves fore. This alternating lateral movement of the trays overlying the base tray tend to further stabilize the device.

The multi-level serving tray carrier of the present invention provides, in addition to a space savings means of serving food from multiple trays utilizing counter or table space ordinarily sufficient for only run tray, enhanced stability in a multi-level serving device. The stability provided by the disclosed device is achieved through limiting, and alternating, the lateral movement of consecutive tray carrying frame levels of the device.

The stability provided by the device of the present invention can be more specifically described and explained as follows, and by referring to FIGS. 16a and 16b. Stability may be defined as the resistance to the tendency of the carrier, and the content it carries, to topple over. In order to cause the device to tip, it is necessary to apply sufficient force to move Tray 2 with its contents and Tray 4, with its contents, over its tipping point—a lateral position in which the force of gravity is applied to the trays with sufficient force as to cause the trays to topple over. Stability can also be defined as the amount of energy necessary and required in order to bring Tray 2, with its' contents, and Tray 4, with its' contents, over (lateral to and beyond) its' tip over point.

For the purpose of describing the aforementioned stability, energy and tipping concepts, lets accept the premise that Tray 2 is rectangular and the contents therein are evenly distributed and homogeneous. As a result, Tray 2 with its' contents is represented as having a center of mass located at point 8. Tray 4 is also rectangular and its' contents are homogenous and evenly distributed. As a result, Tray 4 with its' content is represented as having a center of gravity located at point 10. Also for the purpose of this discussion, the mass of Tray 2 and its' contents is equal to the mass of Tray 4 and its' contents. Also, the mass, height and size of Tray 2 with contents and Tray 4 with its content are the same in both FIGS. 16*a* and 16*b*. Also, the size of the base frame 16 supporting both tray 2 and tray 4 in both FIG. 16*a* and FIG. 16*b* are the same.

Figure 16A:
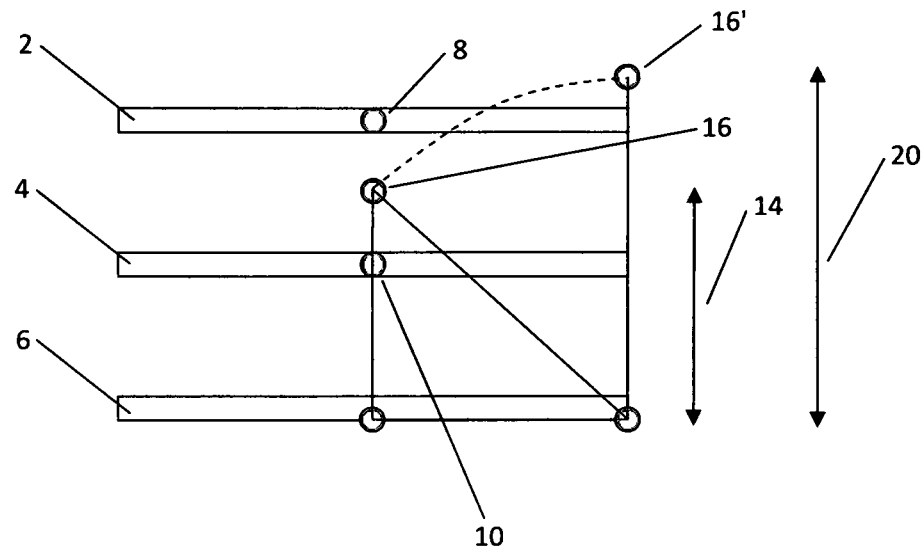
FIG. 16a illustrates a side view of a schematic representation of the tray carrier in a vertically aligned configuration.

In FIG. 16*a*, by combining center of mass 8 and center of mass 10 we get center of mass, 16 with height 14, located equal distance from center of mass 8 and center of mass 10. Stability is further defined as the minimum energy needed or required to bring center of mass 16 to 16'. Center of mass 16 has potential energy and has no kinetic energy. Center of mass 16' also has only potential energy (PE). PE is equal to mass multiplied by the acceleration of gravity by the height of object. The difference in PE of 16' and PE of 16 is the minimum energy added or require to bring Tray 2 with its' content and Tray 4 with its' content to the tip over point. Note that 16 and 16' have the same mass because the trays and the contents are the same. Therefore, mass of 16=mass of 16'=K. Also, the acceleration of gravity ("g") is also a constant. Therefore, the only variable is the height.

PE of 16=mass of 16 X acceleration of gravity X height 14 of 16.

PE of 16=K g 14

PE of 16'=mass of 16' X acceleration of gravity X height 20 of 16'

PE of 16'=K g 20

When we take the difference between PE of 16' and PE of 16 we get the minimum energy needed or require to bring Tray 2 with its content and Tray 4 with its content to its tip over point.

PE of 16'−PE of 16

=K g 20−Kg 14

=K g (20−16) is the final equation for configuration in FIG. 16*a*.

When we find the minimum energy needed or required to bring Tray 2 and its' content and Tray 4 with its' content to its' tip over point in our present invention configuration, we can compare the stability between the two configurations.

To compare we must use the same parameters from before:

Stability is defined by the energy needed or required to bring Tray 2 with its' content and Tray 4 with its' content over its' tip over point. Tray 2 is rectangular and its' contents are evenly distributed and homogenous. As a result, Tray 2 with its' content can be represent by its' center of mass 8. Tray 4 is rectangular and its' contents are evenly distributed and homogenous. As a result, Tray 4 with its' contents demonstrates a center of mass at point 10. The mass of Tray 2 and its' contents are equal to the mass of Tray 4 and its' contents. The mass, height and size of Tray 2 with its' content and Tray 4 with its' contents are the same in FIG. 16*a* and FIG. 16*b*. The size of the base frame illustrated in FIGS. 16*a* and 16*b* is the same.

Figure 16B:
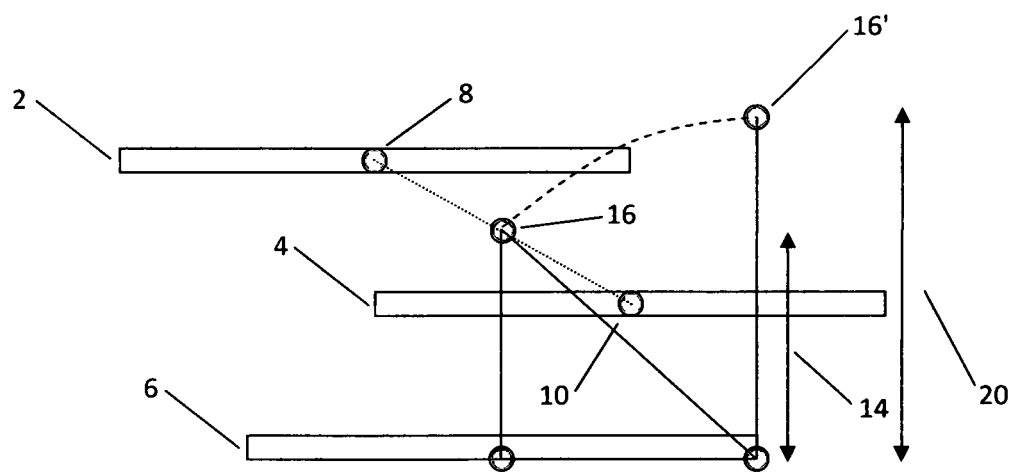
FIG. 16b illustrates a side view of the schematic representation illustrated in FIG. 16a in a staggered configuration.

In FIG. 16*b*, by combining center of mass 8 and center of mass 10 we get center of mass 16, with height 14, located equal distance from center of mass 8 and center of mass 10. In this example, stability can also be defined as the minimum energy needed or required to bring center of mass 16 to 16'. Center of mass 16 has potential energy and has no kinetic energy. Center of mass 16' also has only potential energy. PE is equal to g×m×h (acceleration constant times mass times height. The difference in PE of 16' and PE of 16 is the minimum energy which would be need to be added or require to bring Tray 2 with its' content and Tray 4 with its' content to the tip over point.

Once again, it is a given that 16' and 16 have the same mass because the trays and the contents are the same. Therefore, mass of 16=mass of 16'=K. The only difference is the height since the acceleration of gravity is constant.

PE of 16=mass of 16 X acceleration of gravity X height of 16 (14).

PE of 16=K g 14

PE of 16'=mass of 16' X acceleration of gravity X height of 16' (20).

PE of 16'=K g 20

When we take the difference between PE of 16' and PE of 16 we get the minimum energy needed or require to bring Tray 2 with its content and Tray 4 with its content to its tip over point.

PE of 16'−PE of 16

=Kg 20−Kg 14

=K g (20−14) is the final equation for configuration in FIG. 16*b*.

We can compare the stability in FIG. 16*a* to FIG. 16*b* by comparing the final equations.

K g (20−14) is the final equation for configuration in FIGS. 16*a*.

K g (20−14) is the final equation for configuration in FIG. 16*b*.

Both equations are the same which means that the energy needed or required to bring Tray 2 with its content and Tray 4 with its content to its tip over point is the same in both examples. The diagrams illustrate the lateral movement and stability of the device of the present invention. As shown, the present device, which incorporates lateral displacement of tray frames (in opposite lateral directions, maintains the same degree of stability in an open, serving position FIG. 16*b* as provided in a closed FIG. 16*a* transporting configuration. Furthermore, even when only one tray level is utilized to carry a food tray, the limitation of lateral movement provided by the disclosed device—as disclosed in detail, above prevents the center of gravity of any food supporting level of the device from moving beyond the tipping point.

Thus, stability of the present invention is achieved by the counter balance design integral to its operation as well as restriction of lateral frame movement beyond the above described balance lines. In serving mode, the center of mass of the tray 2 and its' contents are set to be right over and no further than one of the balance lines of the rectangular base frame and the center of mass of the tray 4 and its' contents are also set to be right over and no further than the other (opposite) balance line of the rectangular base frame. The two balance lines are set to be exactly the same distance and opposite from the midline of base frame. This means that the individual center of mass of tray 2 and its' contents and the center of mass of tray 4 and its' contents have moved the same distance away from the midline but in opposite directions. However, the combined center of mass of both trays and their contents have not moved due to the counter balance design. Keeping the combined center of mass of tray 2 and its' contents and tray 4 and its' contents exactly the same as in FIG. 16a.

By configuring the multi-level serving trays carrier to limit lateral movement of all frames overlying the base frame, so that the midlines of such overlying frames can not move laterally beyond the balance lines of the base frame up to 75% of the mass of each the overlying trays and their contents remain positioned over the base frame, the base supporting the device—at all times—. By setting the two balance lines of the base frames so that they define a line running from a point located at one quarter of the length of the base frame side member equidistant from either end thereof, we obtain high stability (75% or most of the mass of the trays and their contents are within the bass of support) and great accessibility (50% of the content of tray 4 are not blocked by tray 2). Tipping over occurs when the center of mass of any object is outside its' base of support. Also, instability occurs when the center of mass of an overlying object is very close to, or at the limit of the perimeter of its supporting base It is important to note that FIG. 16a and FIG. 16b are side views of two stacking configurations the multi-tray serving tray carrier of the present invention can achieve.

I claim:

1. A multi-level serving tray carrier comprising a base at least one locking adjustment frame, at least one tray carrier frame, a plurality of adjustment arms and fixation means wherein the base frame comprises two side members, each of which side members having a top surface, a bottom surface, two side surfaces, two termini located at opposite ends of each such side member, and a distance as measured between the two termini located at opposite ends of each side member defining a length of each of the side members, the length of both side members being equal, a point of reference being located midway between said two termini along the length of said side members defining a midpoint thereof, two additional points of reference being located midway between the midpoint of each side member and the two termini thereof defining two balance reference points of each side member, the side surfaces of each of the two side members also being formed and configured to include at least one sliding adjustment slot formed as an elongated opening therethrough and one pivot bore also formed therethrough; and two end members each of which end members having a top surface, a bottom surface, two side surfaces, two termini, each located at opposite ends of each such end members, the end members each demonstrating a length defined as a distance measured between said two termini, the length of both end members being equal, wherein said two end members and two side members are arranged and affixed together to form a rectangular shaped base frame wherein the two side members are positioned opposite to one another and the two end members are also positioned opposite one another so as to form opposite sides of said rectangular shaped base frame, wherein a reference line running from the midpoint of one side member to the midpoint of the opposite side member defines the midline of the rectangular base frame and two additional reference lines running from opposite balance reference points located upon opposite side members form two balance reference lines of the rectangular base frame, both reference lines and the midline all being disposed at a perpendicular relation with the side members;

at least one locking adjustment frame comprised of two side members each of which said side members having a top surface, a bottom surface, two side surfaces, two termini, each located at opposite ends of each such side member, a distance measured between one termini to the termini located at the opposite end of the side member defining a length of each of said side member, the length of the two side members being equal, one to the other, a point of reference located midway between said two termini along the length of each side member defining a midpoint thereof, each of the two side surfaces of the at least one locking adjustment frame including a locking adjustment slot formed as an elongated opening formed therethrough, the locking adjustment slot including at least two branch lock slots originating and extending laterally therefrom and wherein said side surfaces of the locking adjustment frame each include one pivot bore also formed therewithin and therethrough;

two end members, each of said end members having a top surface, a bottom surface, two side surfaces, two termini located at opposite ends of each such side member, the end members each demonstrating a length defined as a distance measured between said two termini, the length of both end members being equal to one another, wherein said two end members and two side members of the locking adjustment frame are arranged and affixed together to form a rectangular shaped frame with the two side members positioned opposite to one another and the two end members also being positioned opposite one another so as to form opposite sides of said rectangular shaped frame, wherein a reference line running from the midpoint of one side member to the midpoint of the opposite side member defines the midline of the rectangular locking adjustment frame, the midline being perpendicular to both side members;

at least one tray carrier frame comprised of two side members, each having a top surface, a bottom surface and two side surfaces, two termini located at opposite ends of each such side member, a distance measured between one termini to the termini located at the opposite end of each side member defining a length of the side member, the length of the side members being equal to one another, a point of reference located midway between said two termini along the length of each side member defining a midpoint thereof, each of the two side members of the tray carrier frame including two adjustment slots formed as a lateral opening therethrough;

two end members, each of said end members having a top surface, a bottom surface, two side surfaces, two termini located at opposite ends of each such side member, the end members each demonstrating a length defined as a distance measured between said two termini, the length of the two end members being equal to one another, wherein said two end members and two side members of the tray carrier frame are arranged and affixed together to form a rectangular shaped frame with the two side members positioned opposite to one another and the two end members also being positioned opposite one another so as to form opposite sides of said rectangular shaped frame, wherein a reference line running from the midpoint of one side member to the midpoint of the opposite midpoint defines the midline of the rectangular tray carrier, said midline being disposed in a perpendicular relation with each side member;

a plurality of adjustment arms comprised of flattened, elongated struts having two termini located at opposite ends thereof, the length of each such strut being defined as the distance between the two termini located at opposite ends thereof, the midpoint of each strut being defined as a point located midway along the length of each adjustment arm, equidistant from the two termini thereof, each said adjustment arm including two terminal pivot bores formed as bores running therethrough adjacent to each termini thereof, each adjustment arm also including a central pivot bore formed as a bore running through the flattened elongated strut at the midpoint thereof, the adjustment arms being shaped and configured to adjustably affix the base frame, locking adjustment frame and tray carrier frame in such a manner as to enable adjustment of the position of each of said frames in relation to one another in regard to height and lateral position;

fixation means for pivotal attachment of each adjustment arm to another adjustment arm via the central pivot bore formed therewithin so as to form pivotally joined adjustment arms, as well as pivoting and sliding affixation of the adjustment arms to the base frame, locking adjustment frame and tray carrier frame through affixation of the terminal pivot bore of said adjustment arms to the pivot bores and adjustment slots of said frames; wherein the base frame is affixed to the at least one locking adjustment frame positioned above the base frame by means of two pairs of the pivotally joined adjustment arms, the terminal bore of a first adjustment arm of each pair being pivotally affixed to a pivot bore formed in each of the side walls of the base frame while an opposite terminal bore of said adjustment arm is pivotally affixed to the pivot bore formed in both side walls of the locking adjustment frame and the terminal bore of a second adjustment arm of each pair being affixed to the sliding adjustment slot located in both of the side walls of the base frame while an opposite terminal bore of said second adjustment arm is slideably affixed to the locking adjustment slot formed in the side wall of the at least one locking adjustment frame;

the at least one locking adjustment frame being affixed to the tray carrier frame positioned thereabove by means of two pairs the pivotally attached adjustment arms, the terminal bore of a first adjustment arm of each said pair being pivotally affixed, at one terminus thereof, to a pivot bore formed in each of the side walls of the locking adjustment frame and the opposite terminus of said first adjustment arm being affixed to a first sliding adjustment slot formed in each of the side walls of the tray carrier frame, the terminal bore of a second adjustment arm of each said pair of adjustment arms being slideably and pivotally affixed to the locking adjustment slot of the locking adjustment frame while the opposite terminal bore of the second adjustment arm of each pair being slideably and pivotally affixed to a second sliding adjustment slot of the tray carrier frame; wherein the adjustment slots, locking adjustment slots and pivot bores are so configured, shaped and positioned so that when the adjustment arms are both slideably and pivotally connected to the base frame, lateral movement of the locking adjustment frame and tray carrier frame in an alternating fore and aft direction and height adjustment is provided, the fore and aft movement being specifically limited so that neither the locking adjustment frame or tray carrier frame may be moved laterally to a position wherein the midline of either the locking adjustment or tray carrier frame can extend laterally beyond a position overlying the balance reference lines of the base frame, this limitation of lateral movement thereby preventing the center of gravity of either the locking adjustment frame or tray carrier frame to be displaced so far laterally as to cause the device to become unstable and tip.

2. The multi-level serving tray carrier of claim 1 wherein the base frame, the at least one locking adjustment frame and the at least one tray carrier frame is formed from a plastic material.

3. The multi-level serving tray carrier of claim 2 wherein the plastic material is selected from the group consisting of, polyethylene (PE), polypropylene, acetal, acrylic, nylon (polyamides), polystyrene, polyvinyl chloride (PVC), acrylonitrile butadiene styrene (ABS) and polycarbonate, nylon, polyethylene and polystyrene plastic.

4. The multi-level serving tray carrier of claim 1 wherein the base frame, the at least one locking adjustment frame and the at least one tray carrier frame is formed from a metal material.

5. The multi-level serving tray carrier of claim 4 wherein the metal material is selected from the group consisting of steel alloys, copper, aluminum and aluminum alloys.

\* \* \* \* \*